US008479977B2

(12) United States Patent
Claghorn et al.

(10) Patent No.: US 8,479,977 B2
(45) Date of Patent: Jul. 9, 2013

(54) METHOD OF RECEIVING AND PAYING OUT BILLS

(75) Inventors: Roger O. Claghorn, Ellisville, MO (US); Michael E. Schneidman, Valley Park, MO (US)

(73) Assignee: Coin Acceptors, Inc., St. Louis, MO (US)

( * ) Notice: Subject to any disclaimer, the term of this patent is extended or adjusted under 35 U.S.C. 154(b) by 463 days.

(21) Appl. No.: 12/446,268

(22) PCT Filed: Oct. 22, 2007

(86) PCT No.: PCT/US2007/022476

§ 371 (c)(1), (2), (4) Date: Dec. 16, 2010

(87) PCT Pub. No.: WO2008/051536

PCT Pub. Date: May 2, 2008

(65) Prior Publication Data

US 2011/0125311 A1 May 26, 2011

Related U.S. Application Data

(60) Provisional application No. 60/862,346, filed on Oct. 20, 2006.

(51) Int. Cl.
*G06F 19/00* (2006.01)

(52) U.S. Cl.
USPC .......................................... 235/379; 235/475

(58) Field of Classification Search
USPC ................. 235/379, 475, 482, 483, 484, 485
See application file for complete search history.

(56) References Cited

U.S. PATENT DOCUMENTS

2007/0001389 A1* 1/2007 Goetz ...................... 271/265.04

* cited by examiner

*Primary Examiner* — Karl D Frech

(74) *Attorney, Agent, or Firm* — Polster Lieder Woodruff & Lucchesi, L.C.

(57) ABSTRACT

A method of receiving and paying out bills including the steps of providing a bill passage in about the central portion of an elongate casing that extends along one side of a bill receiving chamber having a bill payback: outlet; providing a bill conveying apparatus for conveying a bill delivered to said bill passage to a predetermined position for receiving it; utilizing a bill pushing member being capable of moving in a reciprocating motion across said passage to bill receiving chamber when the bill located at said predetermined position in said passage to be received, effects receiving of the bill by pushing it with a surface of said bill pushing member across from said passage; disengaging the rearmost bill from said bill receiving chamber by operating bill extracting apparatus in the reverse direction by a predetermined amount while said bill pushing member is activated causing it to extract away and pull out from a rearmost bill leading edge retainer which holds the remaining bills in position; and, operating the extracting apparatus in the forward direction to transport said extracted rearmost bill through said bill payback outlet to said bill conveying apparatus which is operated in reverse to direct it to the customer.

12 Claims, 7 Drawing Sheets

METHOD OF RECEIVING AND PAYING OUT BILLS

The present invention claims priority to U.S. Provisional Patent Application No. 60/862,346, filed Oct. 20, 2007. The contents of said application are incorporated herein by reference.

BACKGROUND OF THE INVENTION

A bill receiving and payout device used for a vending machine or a money exchanger consists generally of a bill discrimination device for discriminating whether a deposited bill is a true bill or a false one including the denomination thereof and a bill receiving device for receiving a bill which has been accepted as a true bill by the bill discrimination device. Known in the art are various bill receiving devices. A bill receiving device capable of paying out a once received bill per se is known. Also known is a bill receiving device capable of stacking bills of two different denominations separately. These prior art bill receiving devices having special functions have a common defect that they are obliged to adopt a relatively large-scale construction. In the bill receiving device capable of paying out a once received bill, for example, a large-scale bill payout mechanism is required. A bill receiving device capable of stacking bills of two different denominations separately, require separate receiving structures and mechanisms for their respective denominations.

U.S. Pat. No. 4,731,523 describes a bill receiving device for storing two types of bills, one on each side of a central bill passageway and uses a bill pushing member to reciprocate from one side of the central passage to stack one type of bill, or from the other direction to stack the other type of bill. A separate motor, gear and roller arrangement is attached to and transported with the bill pushing member for paying out a bill from at least one of the bill stacks is shown. A total of three motors and two solenoids are disclosed.

SUMMARY OF THE INVENTION

It is, therefore, an object of the present invention to provide a bill receiving device capable of dividing bills into two kinds, and separately storing the divided bills and paying out at least one specific denomination using a very simple and compact construction.

For achieving the above described object, the bill receiving device according to the invention is characterized in that it comprises a bill passage in about the central portion of an elongate casing that extends in a first direction along one side of a first bill receiving chamber having a bill payback outlet, and redirected around and extending in an opposite second direction along the second side of said first bill receiving chamber, provides a second bill receiving chamber extending along the outer side of the said passage second direction and across from and aligned with the said first bill receiving chamber, provides a bill conveying apparatus for conveying a bill delivered to said bill passage first or second directions to a predetermined position for receiving it, utilizes a bill pushing member for moving in a reciprocating motion across said passage first direction to said first bill receiving chamber when the bill is located at a predetermined position in said passage first direction to be received, effects receiving of the bill when pushing it with a surface of said bill pushing member across from said passage first direction, receives a bill in said second bill receiving chamber that is in a predetermined position in said passage second direction by pushing it with an extendable surface from said first bill receiving chamber by activating the said bill pushing member across from said passage first direction, and, activates a bill conveying member for moving the rearmost bill from said first bill receiving chamber through its said bill payback outlet to the said bill conveying apparatus operated in reverse to direct the said rearmost bill for paying back to the customer.

It is a further object of this invention to provide very reliable method for extracting a bill for payout by extraction, and determination of extraction of the rearmost bill out from a bill stack using an upper edge retainer/deflector and a rubber cam roller operating in a first direction, and then in a second direction.

BRIEF DESCRIPTION OF THE DRAWINGS

In the accompanying drawings.

DESCRIPTION OF PREFERRED EMBODIMENTS

Figure 1:
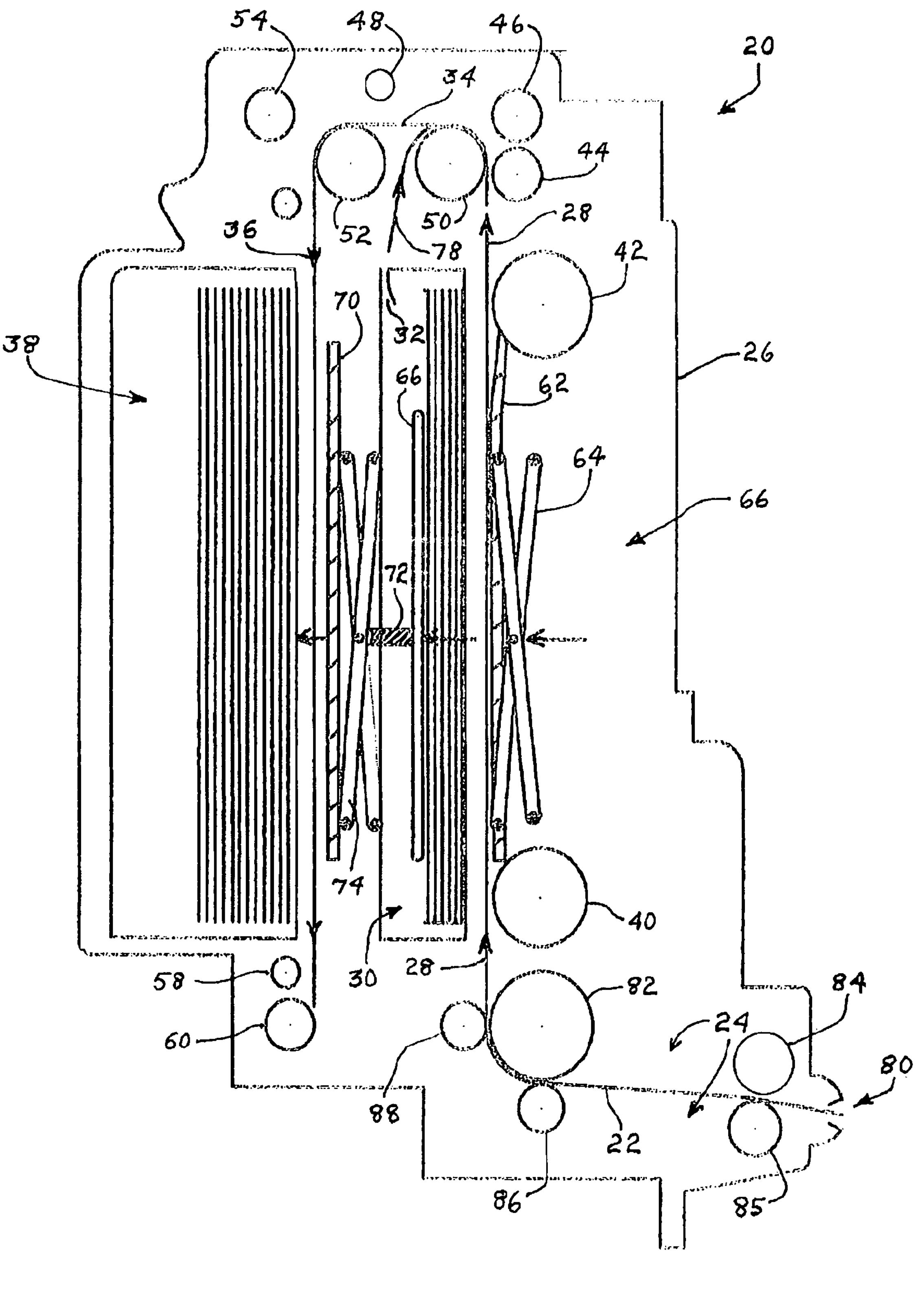
FIG. 1 is a simplified drawing of a sectional side view showing an embodiment of the bill receiving and payout device of the invention.

The preferred embodiment of the present invention provides a method of receiving and paying out bills comprises the steps of providing a bill passage in about the central portion of an elongate casing that extends in a first direction along one side of a first bill receiving chamber having a bill payback outlet, and redirected around and extending in an opposite second direction along the second side of said first bill receiving chamber, provides a second bill receiving chamber extending along the outer side of the said passage second direction and across from and aligned with the said first bill receiving chamber, provides a bill conveying apparatus for conveying a bill delivered to said bill passage first or second directions to a predetermined position for receiving it, utilizes a bill pushing member for moving in a reciprocating motion across said passage first direction to said first bill receiving chamber when the bill is located at a predetermined position in said passage first direction to be received, effects receiving of the bill when pushing it with a surface of said bill pushing member across from said passage first direction, receives a bill in said second bill receiving chamber that is in a predetermined position in said passage second direction by pushing it with an extendable surface from said first bill receiving chamber by activating the said bill pushing member across from said passage first direction, and, activates a bill conveying member for moving the rearmost bill from said first bill receiving chamber through its said bill payback outlet to the said bill conveying apparatus operated in reverse to direct the said rearmost bill for paying it back to the customer.

Another method of receiving and paying out bills comprises the steps of providing a bill passage in about the central portion of an elongate casing that extends along one side of a bill receiving chamber having a bill payback outlet, provides a bill conveying apparatus for conveying a bill delivered to said bill passage to a predetermined position for receiving it, utilizes a bill pushing member being capable of moving in a reciprocating motion across said passage to bill receiving chamber when the bill located at said predetermined position in said passage to be received, effects receiving of the bill by pushing it with a surface of said bill pushing member across from said passage, disengages the rearmost bill from said bill receiving chamber by operating bill extracting apparatus in the reverse direction by a predetermined amount while said bill pushing member is activated causing it to extract away and pull out from a rearmost bill leading edge retainer which holds the remaining bills in position, and, operates the extracting apparatus in thr forward direction to transport said extracted rearmost bill through said bill payback outlet to said bill conveying apparatus which is operated in reverse to direct it to the customer.

A method is shown providing a bill validator that is adaptable for bill payback by utilizing an attachable bill hopper module to fit between the bill stacker and the bill validator.

A simplified sectional side view drawing of the bill receiving and payout device 20 is shown in FIG. 1 having a bill validation passage 22 with its associated sensors and circuitry placed the general location 24 for the validation of inserted bills. Within the elongate portion 26 of the device 20, a validated bill is directed upward in a passage first direction 28 along the one side of a first bill receiving chamber 30 having a bill payback outlet 32. The passage first direction 28 is redirected around at path 34 and extends in the opposite passage second direction 36 along the rear side of the first bill receiving chamber 30. The second bill receiving chamber 38 extends along the outer side of the passage second direction 36 across from, and aligned with the first bill receiving chamber 30. The bill conveying apparatus for conveying a bill to the passage first or second directions 28 or 36 is accomplished by belts (not shown) moved along the passageways by pulleys 40 through 60 which support the left portion of the bills. A corresponding set of pulleys and belts (not shown and directly behind) are located to support the right portion of the said bills. The space between the left and right belt supported edges is sufficient to transfer bills out from the bill passage way 28 or 36 and into the first or second bill receiving chamber 30 or 38, respectively. A bill pushing member 62 (slightly less in width than the space between the bill supported edges in the passages) moves in a reciprocating motion across the passage first direction 28 to place a bill in the first bill receiving chamber 30 when the bill is positioned in front of the bill pushing member 62, and is controlled by the scissor mechanism 64 and driven by the motor/gear reciprocating device (not shown) in location 66. A bill is pushed in the second bill receiving chamber 38 when it is in a predetermined position in the passage second direction 36 by the bill pushing member 70 located at the rear of the first bill receiving chamber 30. The bill pushing member 70 is moved by the bill pushing member 62 pushing the stacked bills of the first bill receiving chamber 30 with its projection 72 pushing the scissor mechanism 74. This moves the pushing member 70 (which is slightly less in width than the unsupported central portion of the bill) to move the bill from the passage 36 and into the second receiving chamber 38.

Typically only the lowest denomination bills are stacked in the first receiving chamber 30 for bill payback. This is provided by removing a rearmost stacked bill 96 (shown in FIG.

4 in more detail) from the first bill receiving chamber 30 by moving it through the bill payback outlet 32 via the path 78 to the passages 34, 28 and the bill validation passage 22 by operating the bill conveying apparatus in the reverse direction to convey the bill out to the bill inlet 80 for customer payback.

The driving rollers 82 and 84 are geared together with the conveying apparatus of first and second passages 28 and 36 by pulley 40 to convey the bill while in the validation passage 22. The idler rollers 86 and 88 maintain a bill's contact with the driven pulley 82 when being moved between the passages 28 and 22. Idler roller 85 maintains a bill's contact with driving roller 84.

Figure 2:
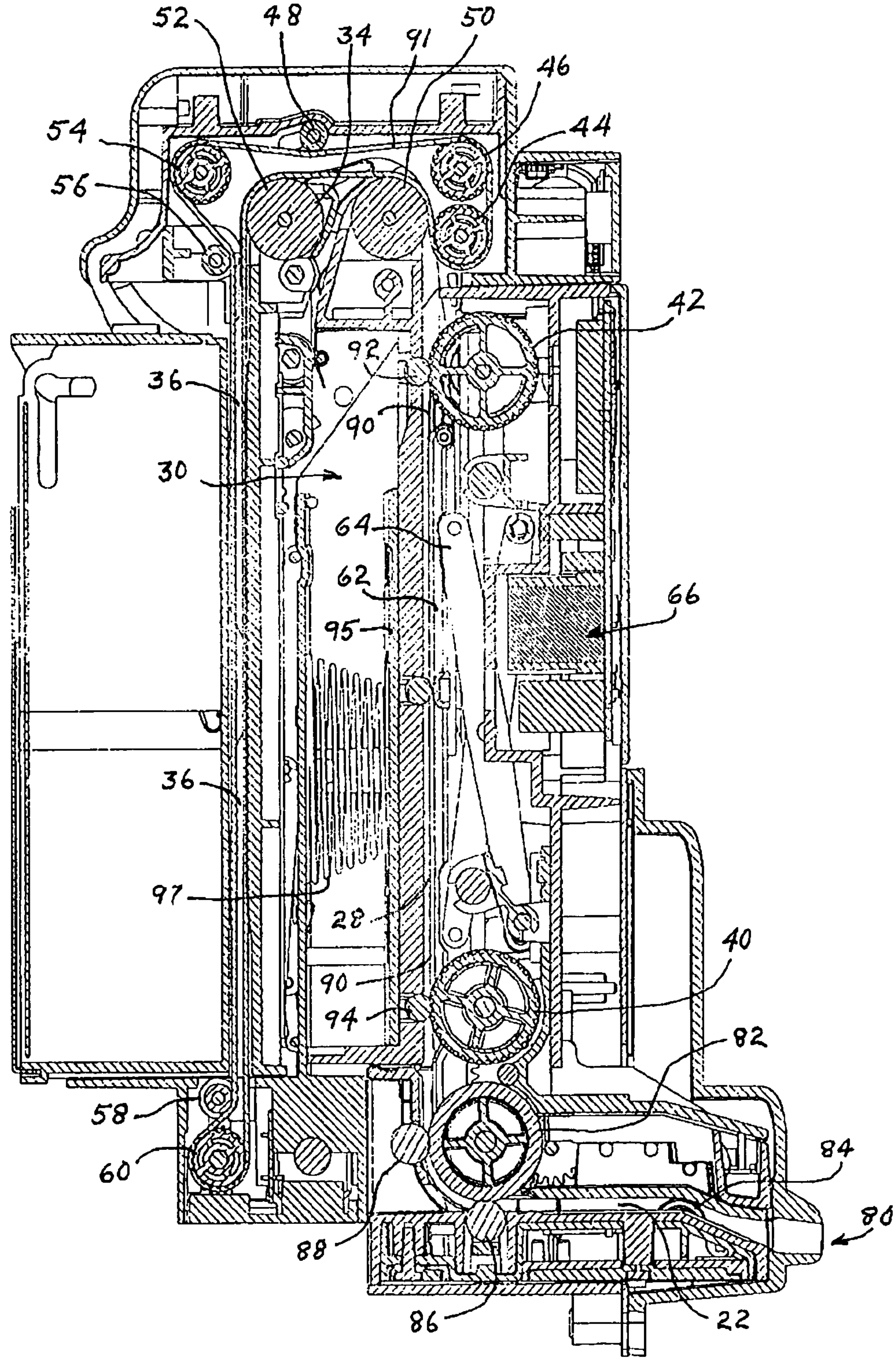
FIG. 2 is a sectional side view of the preferred embodiment showing the two bill receiving chambers and their associated pushing plates in their repose positions.

The cross sectional left side view of the preferred embodiment in FIG. 2 shows further details of the bill inlet 80, the conveying belt 90 with its pulleys 40 and 42, and pressure rollers 92 and 94. The conveyer belt 90 is directed around the pulleys and rollers 40, 42, 92, 94, to convey the bill along the passage first direction 28. The second conveyor belt 91 is positioned for the redirected passage 34 and the opposite passage second direction 36 controlled by pulleys and rollers 44 through 60. The pulleys 82 and 84 with pressure rollers 86 and 88 are geared with the driven pulley 40 to transport the bill between the bill inlet 80 (outlet) at the validation passage 22 and passage first direction 28. The belts, pulleys and rollers for conveying the bill's right edge is directly behind the ones shown herein for the left side. The bill pushing member 62 connected to the scissor mechanism 64 (shown in repose position) is driven by the motor/gear reciprocating device in location 66 to transfer a bill from the passage first direction 28 to the first bill receiving chamber 30. The press plate 95 is provided for pushing bills received in the bill receiving chamber 30 inwardly by the force of spring 97.

Figure 3:
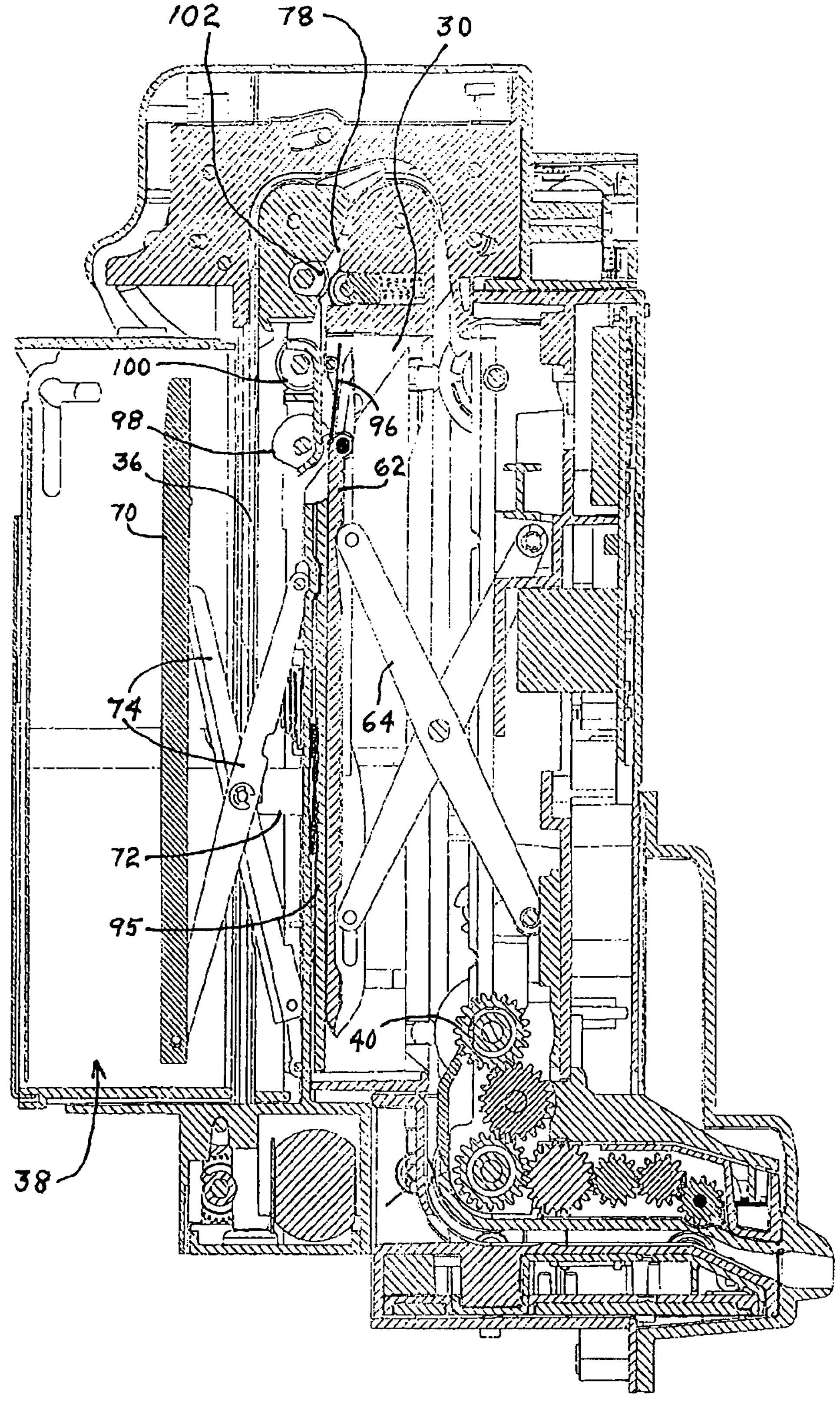
FIG. 3 is a sectional side view showing the two bill receiving chambers and their associated pushing plates in the extended positions.

In FIG. 3 the scissor mechanism 64 is shown in the extended position moving its bill pushing member 62 to transfer a bill 96 into the first bill receiving chamber 30 which also pushes the spring loaded press plate 95 with its projection 72 to operate the scissor mechanism 74 at the rear of the receiving chamber 30. This moves the pushing member 70 and will transfer a bill when it is conveyed to the passage 36 for transferring into the second receiving chamber 38. The rollers 98, 100 and 102 will extract the rearmost bill 96 to the path 78 as will be detailed next.

Figure 4:
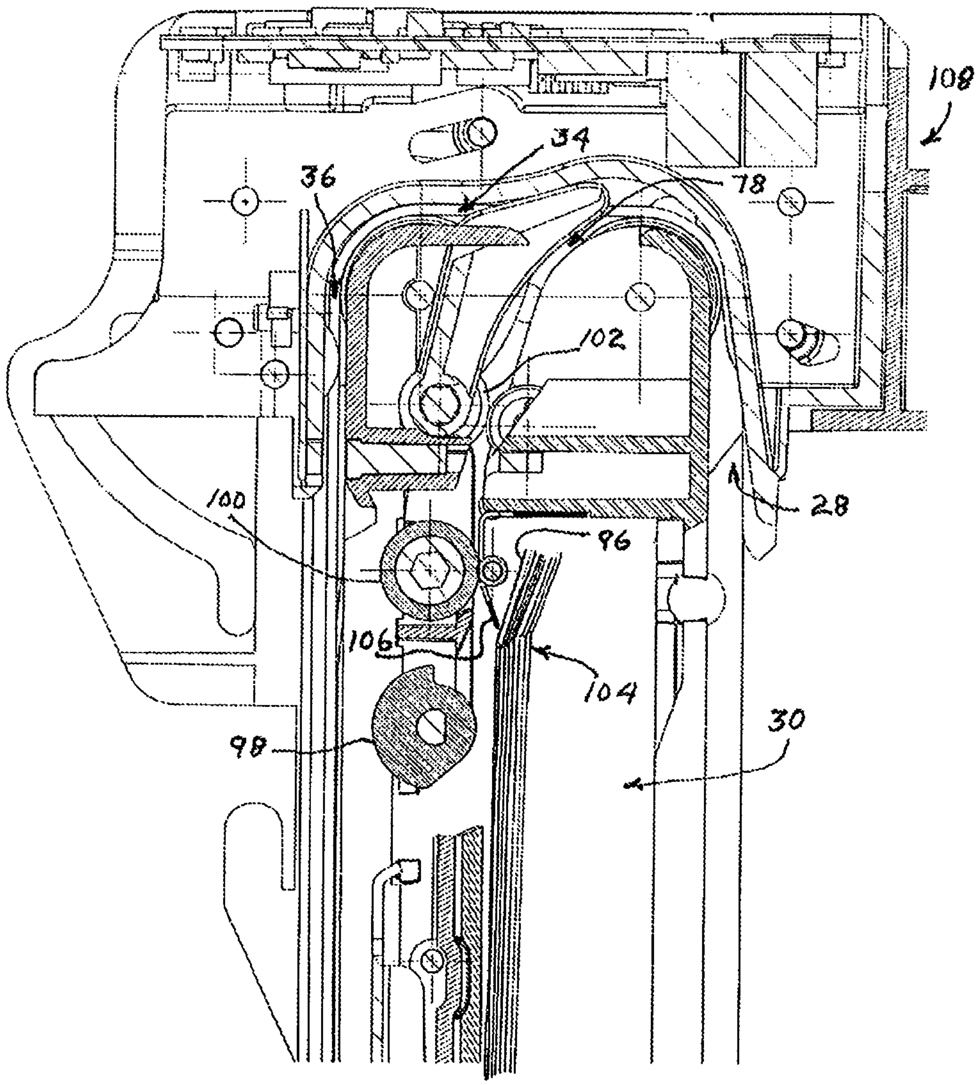
FIG. 4 is a sectional side view of the first bill receiving chamber when its rearmost bill is in its first state of payout.

FIG. 4 is a cross sectional left side view just past the left conveying belts showing the bill rollers for paying out bills from the first bill receiving chamber 30. The separation cam roller 98 is geared with driving rollers 100 and 102 and geared with the payout motor located at the location 108. During the first step for bill payback, the bill stack 104 is pushed against the upper bill retainer 106 by the pusher plate 62 (shown in FIG. 3) and places the rearmost bill 96 in close relationship to the separation cam roller 98 which has a contact surface which consists of a material of a large coefficient of friction such as rubber.

Figure 5:
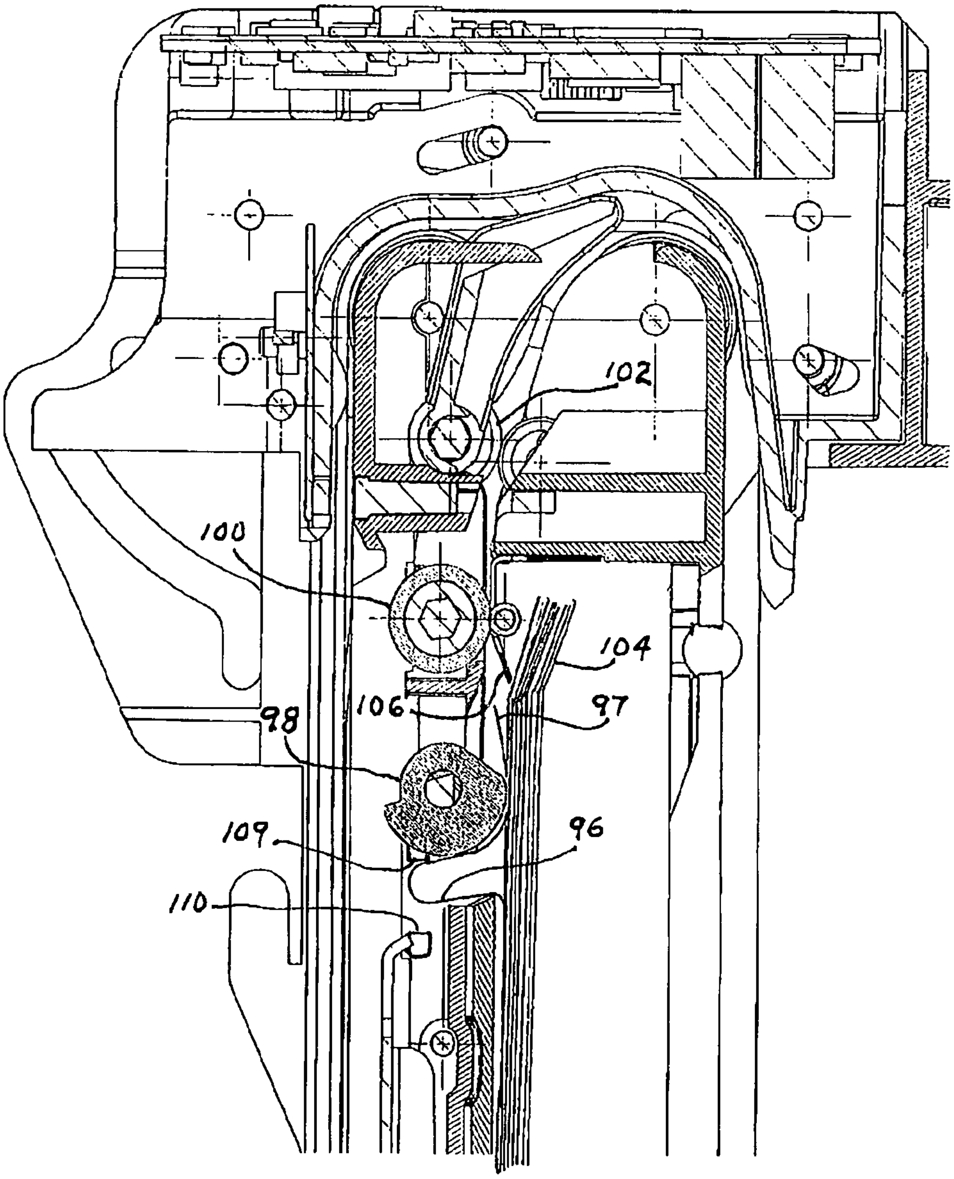
FIG. 5 is a sectional side view of the first bill receiving chamber when its rearmost bill is in its second state of payout.

In FIG. 5 the second step for bill payback occurs with the separation cam roller 98 rotating clockwise (together with rollers 100 and 102) to engage and retract the upper portion of the rearmost bill 96 from between the bill stack 104 and the upper bill retainer 106 until it extends around and below it to break a light beam coming from the emitting surface 109 and entering the sensor surface 110. This guarantees that the bill 96 edge 97 has been removed from between the upper bill retainer 106 and the bill stack 104.

Figure 6:
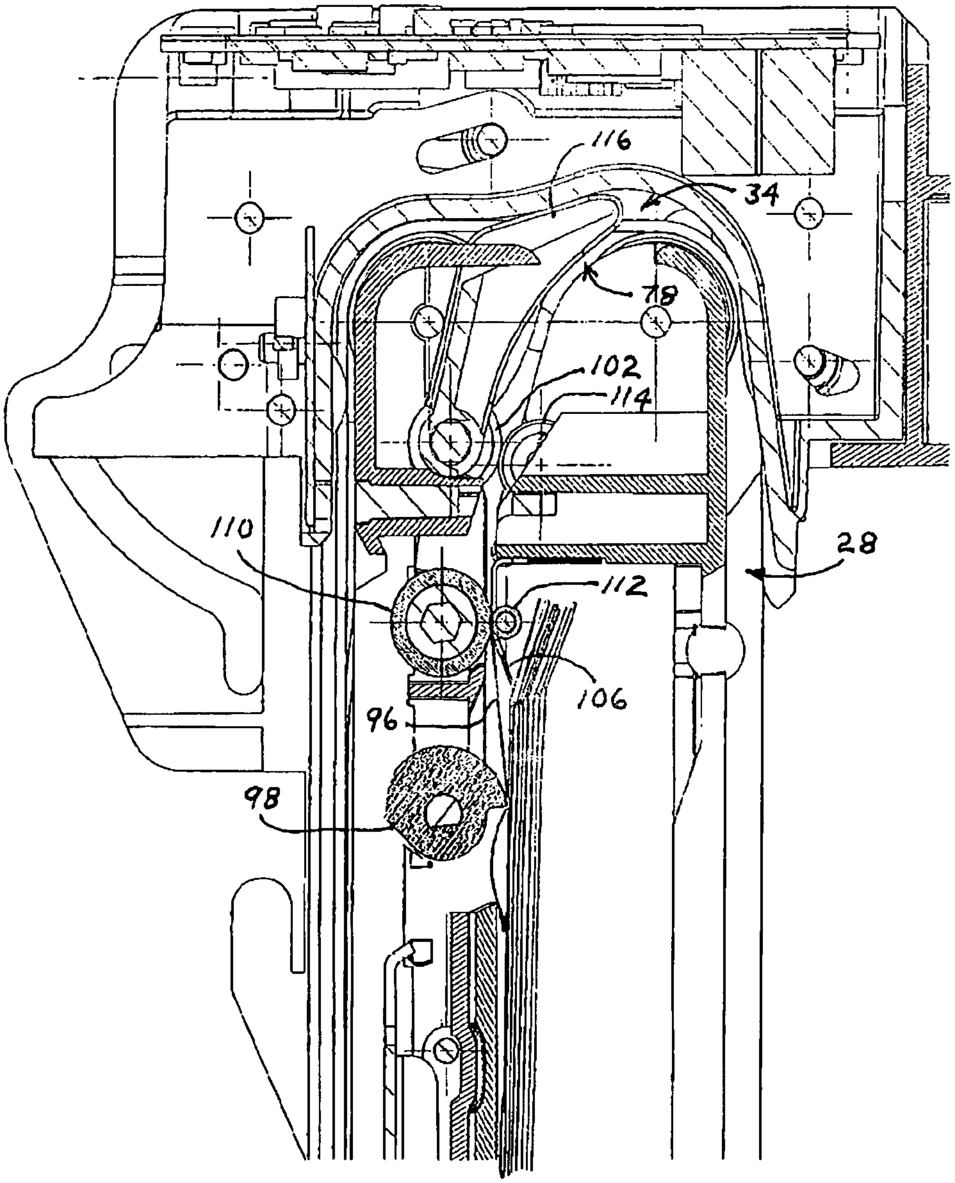
FIG. 6 is a sectional side view of the first bill receiving chamber when its rearmost bill is in its third state of payout.

In FIG. 6 the third step for bill back starts by rotating the separation cam roller 98 in the counterclockwise direction which moves the released upper edge of the bill 96 upward to enter between the roller 100 and its idler roller 112. The upper bill retainer 106 serves to guide the upper edge of the extracted bill 96 that then continues upwards to the drive roller 102 and its idler roller 114, and outwards through the passages 78, 34, 28 and into the validation passage 22 (shown in FIG. 2). The diverter gate 116 moves to open the path to the passage way 34 during payback by friction from the driving roller 102, and close it during the time that the bills are being directed to the bill receiving chamber 38 (shown in FIG. 3). The conveying belts are operated in the reverse direction during the three steps of bill payback until the bill 96 extends out from the bill entrance 80 (FIG. 2) sufficiently to be received by the customer yet retained to prevent accidental discharge.

Figure 7:
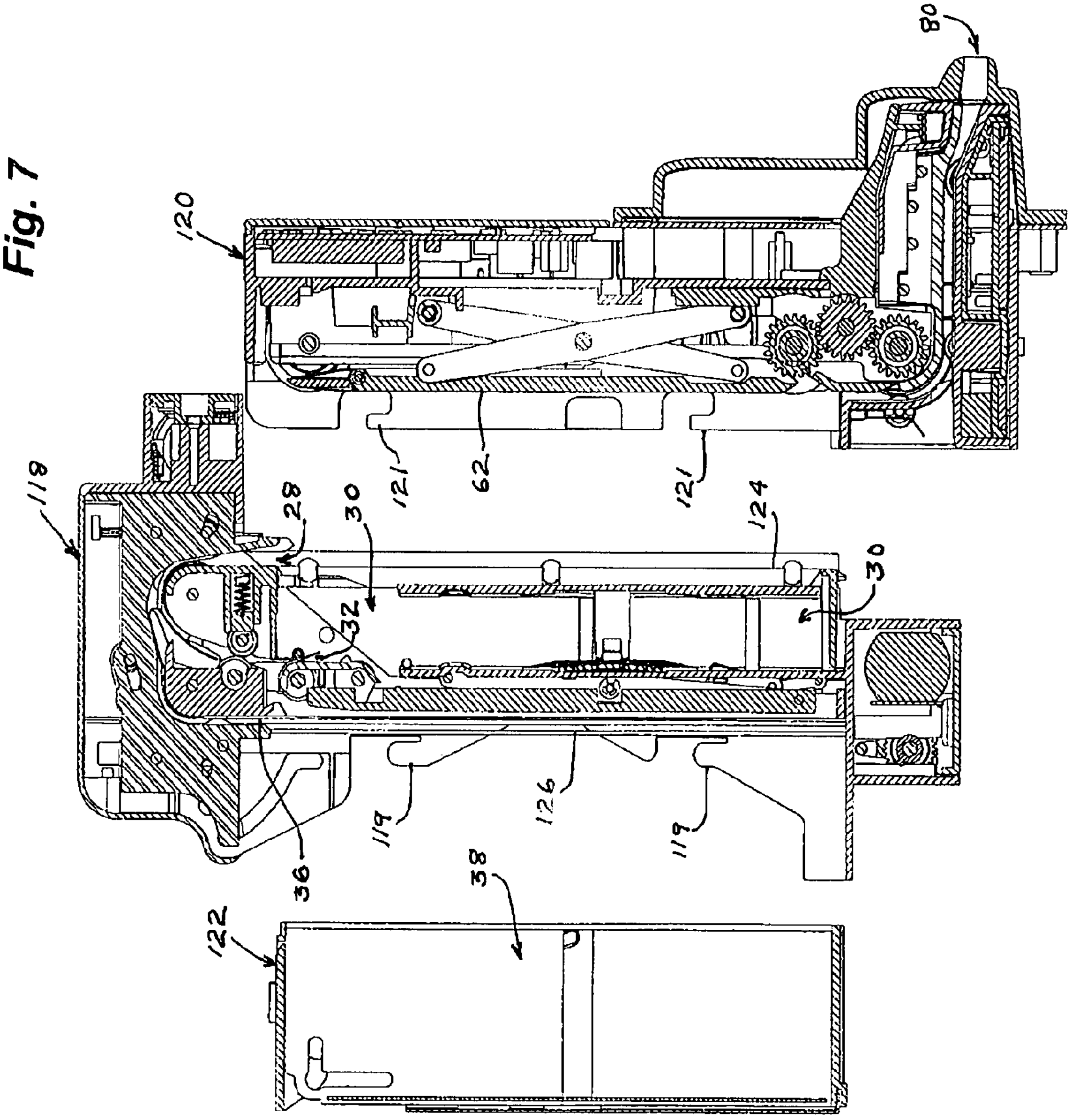
FIG. 7 is sectional side view of the preferred embodiment of the invention showing the three module portions unattached to show simplicity of convertibility.

FIG. 7 is a side view showing the modularity feature of the preferred embodiment with its center module 118 having the first bill receiving chamber 30, with the payback and conveying provisions. The bill validation and stacking module 120 consists of the bill entry 80, microprocessor, primary stacker plate 62, conveyor assembly, interconnection fingers 121 and other associated components. The left module 122 is the bill receiving chamber 38 with its spring biased bill plate and has simple means to be attached to the center module 118 attachment fingers 119. This feature provides for the conversion of the bill validator with bill payback to one without, by simply disconnecting the center module 118, and connecting only a bill receiving module like the left module 122. The right and left surfaces 124 and 126 of the center module 118 are at the passage first direction 28 along the one side of a first bill receiving chamber 30 having a bill payback outlet 32, and the opposite passage second direction 36 along the rear side of the first bill receiving chamber 30. When the center module 118 is not used, and the bill receiving module 38 is attached to the bill receiving and validation module 120, only the passage first direction 28 is reinstated with the primary stacker plate 62 stacking the bills directly into the bill receiving module 38. In this instance the bill receiving module may be of a larger expandable type.

Conversion from validating and stacking of bills only, to include the bill payback provision of module 118, is likewise made very easily.

The forgoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by the details of the embodiments presented in this description. The above specification, examples provide a complete description of the manufacture and use of the invention. Many embodiments of the invention can be made without departing from the spirit and scope of the invention.

What is claimed is:

1. A method of receiving and paying out bills comprising:

providing a bill passage the central portion of an elongate casing that extends in a first direction along one side of a first bill receiving chamber having a bill payback outlet, and redirected around and extending in an opposite second direction along the second side of said first bill receiving chamber;

providing a second bill receiving chamber extending along the outer side of the said passage second direction and across from and aligned with the said first bill receiving chamber;

providing a bill conveying apparatus for conveying a bill delivered to said bill passage first or second directions to a predetermined position for receiving it;

utilizing a bill pushing member for moving in a reciprocating motion across said passage first direction to said first bill receiving chamber when the bill is located at a predetermined position in said passage first direction to be received, effects receiving of the bill when pushing it with a surface of said bill pushing member across from said passage first direction;

receiving a bill in said second bill receiving chamber that is in a predetermined position in said passage second direction by pushing it with an extendable surface from said first bill receiving chamber by activated the said bill pushing member across from said passage first direction; and, activating a bill extracting apparatus for moving the rearmost bill from said first bill receiving chamber through its said bill payback outlet to the said bill conveying apparatus operated in reverse to direct the said rearmost bill for paying back to the customer.

2. A bill receiving and payout device comprising:

a bill passage provided the central portion of an elongate casing that extends in a first direction along one side of a first bill receiving chamber with a bill payback outlet, and is redirected around to extend in an opposite second direction along the second side of said first bill receiving chamber;

a second bill receiving chamber extends along the outer side of the said passage second direction and across from and aligned with the said first bill receiving chamber;

bill conveying apparatus for conveying a bill delivered to said bill passage first or second directions to a predetermined position for receiving it;

a bill pushing member being capable of moving in a reciprocating motion across said passage first direction to said first bill receiving chamber when the bill located at a predetermined position in said passage first direction to be received, effects receiving of the bill by pushing it with a surface of said bill pushing member across from said passage first direction;

said second bill receiving chamber receiving a bill that is in a predetermined position in said passage second direction, with the bill to be received, effects receiving of the bill by pushing it with an extendable surface from said first bill receiving chamber which is activated by the said bill pushing member across from said passage first direction; and, said first bill receiving chamber having a bill extracting apparatus for moving the rearmost bill through its said bill payback outlet to said bill conveying apparatus which is operated in reverse to direct the said rearmost bill to the customer.

3. A method of receiving and paying out bills comprising:

providing a bill passage the central portion of an elongate casing that extends along one side of a bill receiving chamber having a bill payback outlet;

providing a bill conveying apparatus for conveying a bill delivered to said bill passage to a predetermined position for receiving it;

utilizing a bill pushing member being capable of moving in a reciprocating motion across said passage to bill receiving chamber when the bill located at said predetermined position in said passage to be received, effects receiving of the bill by pushing it with a surface of said bill pushing member across from said passage;

disengaging the rearmost bill from said bill receiving chamber by operating bill extracting apparatus in the reverse direction by a predetermined amount while said bill pushing member is activated causing it to extract away and pull out from a rearmost bill leading edge retainer which holds the remaining bills in position; and, operating the extracting apparatus in the forward direction to transport said extracted rearmost bill through said bill payback outlet to said bill conveying apparatus which is operated in reverse to direct it to the customer.

4. A bill receiving and payout device comprising:

a bill passage provided the central portion of an elongate casing that extends along one side of a bill receiving chamber having a bill payback outlet;

bill conveying apparatus for conveying a bill delivered to said bill passage to a predetermined position for receiving it;

a bill pushing member being capable of moving in a reciprocating motion across said passage to bill receiving chamber when the bill located at said predetermined position in said passage to be received, effects receiving of the bill by pushing it with a surface of said bill pushing member across from said passage;

a bill extracting apparatus disengages the rearmost bill from said bill receiving chamber by operating in the reverse direction by predetermined amount while said bill pushing member is activated causing it to extract away and pull out from a rearmost bill leading edge retainer which holds the remaining bills in position; and, the extracting apparatus operates in the forward direction to transport said disengaged rearmost bill through said bill payback outlet to said bill conveying apparatus which is operated in reverse to direct it to the customer.

5. The apparatus of claim 4 wherein the extracting apparatus consists of at least one reversible driven roller pressing against said rearmost bill when activating said bill extracting apparatus.

6. The apparatus of claim 5 wherein the extracting apparatus consists of a rearmost bill leading edge retainer which holds the remaining bill's leading edge in position.

7. A method of disengaging a rearmost bill from a bill receiving chamber having a receiving passage at its front and a bill payback outlet for payout of its rearmost stacked bill, comprising:

utilizing a bill pushing member with a surface being capable of moving in a reciprocating motion across said receiving passage to said bill receiving chamber for pushing bills into said bill stack;

providing a rearmost bill leading edge retainer which captures the leading portion of rearmost bills in the said receiving chamber;

operating a bill extracting apparatus in a reverse direction by a predetermined amount to extract away said rearmost bill and pull it out from said rearmost bill leading edge retainer holding the remaining bills in position; and, operating said bill extracting apparatus in the forward direction to transport said disengaged rearmost bill through said bill payback outlet to the said bill conveying apparatus operated in reverse to transport it to the customer.

8. The method of claim 7 wherein the extracting apparatus consists of at least one reversible driven roller pressing against said rearmost bill when activating said bill extracting apparatus.

9. A bill validation and receiving device adaptable for bill payout, comprising:

a first module containing a bill inlet, bill validation sensors, microprocessor control, bill pushing apparatus, a bill conveying system, and a module interconnection for a second module;

said second module with a bill passage within the central portion of an elongate casing that extends in a first direction along one side of a first bill receiving chamber and is redirected around to extend in an opposite second direction along the second side of said first bill receiving chamber including a bill conveying apparatus for receiving and payout of bills, and module interconnections for said first module and a third module; and;

said third module with a second bill receiving chamber for extending along the outer side of the said passage opposite second direction across from and aligned with the said first bill receiving chamber of said second module and, incorporating a module interconnection therewith.

10. A method of adapting a bill validator for incorporating bill payback comprising:

providing a first module containing a bill inlet, bill validation sensors, microprocessor control, bill pushing apparatus, a bill conveying system, and a module interconnection for a second module;

providing a said second module with a bill passage within the central portion of an elongate casing that extends in a first direction along one side of a first bill receiving chamber and is redirected around to extend in an opposite second direction along the second side of said first bill receiving chamber including a bill conveying apparatus for receiving and payout of bills, and module interconnections for said first module and a third module; and, providing a said third module with a second bill receiving chamber for extending along the outer side of the said passage opposite second direction across from and aligned with the said first bill receiving chamber of said second module, and incorporating a module interconnection therewith.

11. The method of claim 10 wherein the said third module incorporating a module interconnection that can be interconnected directly to the first said module when the said second module is removed.

12. A method of disengaging a rearmost bill from a bill receiving chamber having a receiving passage at its front and a bill payback outlet for payout of its rearmost stacked bill, comprising:

utilizing a bill pushing member with a surface being capable of moving in a reciprocating motion across said receiving passage to said bill receiving chamber for pushing bills into said bill stack;

providing a rearmost bill leading edge retainer which captures the leading portion of the rearmost bill in the said receiving chamber;

operating a bill extracting cam in a reverse direction to extract away said leading portion of the rearmost bill from said rearmost leading edge retainer;

sensing the amount of deflection of said rearmost bill to determine when said reverse direction is sufficient to move said leading portion out from said rearmost bill leading edge retainer to its opposite side;

operating said bill extracting cam and payout roller in the forward direction to transport said extracted leading edge of rearmost bill through said bill payback outlet located along the said opposite side of the said rearmost bill leading edge retainer; and, operating said bill conveying apparatus in reverse to transport said rearmost bill to the customer.

* * * * *